US012619110B2

(12) United States Patent
Junge et al.

(10) Patent No.: US 12,619,110 B2
(45) Date of Patent: May 5, 2026

(54) DEVICE FOR THE REGULATION OF LIGHT TRANSMISSION

(71) Applicant: MERCK PATENT GMBH, Darmstadt (DE)

(72) Inventors: Michael Junge, Darmstadt (DE); Andreas Beyer, Darmstadt (DE); Ewa Dominika Ptak, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 47 days.

(21) Appl. No.: 18/266,424

(22) PCT Filed: Dec. 9, 2021

(86) PCT No.: PCT/EP2021/084904
§ 371 (c)(1),
(2) Date: Jun. 9, 2023

(87) PCT Pub. No.: WO2022/122871
PCT Pub. Date: Jun. 16, 2022

(65) Prior Publication Data

US 2024/0134218 A1 Apr. 25, 2024

(30) Foreign Application Priority Data

Dec. 11, 2020 (EP) .................................... 20213328

(51) Int. Cl.

| | |
|---|---|
| ***G02F 1/13*** | (2006.01) |
| ***C09K 19/04*** | (2006.01) |
| ***C09K 19/30*** | (2006.01) |
| ***C09K 19/32*** | (2006.01) |
| ***G02F 1/137*** | (2006.01) |

(52) U.S. Cl.
CPC .......... *G02F 1/132* (2013.01); *C09K 19/0403* (2013.01); *C09K 19/3003* (2013.01); *C09K 19/3068* (2013.01); *C09K 19/322* (2013.01); *G02F 1/13712* (2021.01); *C09K 2019/3004* (2013.01); *C09K 2019/3009* (2013.01); *C09K 2019/323* (2013.01); *C09K 2219/17* (2013.01)

(58) Field of Classification Search
CPC ...................................................... C09K 19/60
See application file for complete search history.

(56) References Cited

U.S. PATENT DOCUMENTS

| | | | |
|---|---|---|---|
| 4,276,047 | A | 6/1981 | Imahori et al. |
| 4,308,161 | A | 12/1981 | Aftergut et al. |
| 4,308,162 | A | 12/1981 | Cole, Jr. et al. |
| 4,340,973 | A | 7/1982 | Umetsu |
| 4,350,603 | A | 9/1982 | Aftergut et al. |
| 4,395,350 | A | 7/1983 | Boller et al. |
| 4,402,854 | A | 9/1983 | Moeller et al. |
| 4,405,211 | A | 9/1983 | Harrison et al. |
| 4,408,840 | A | 10/1983 | Imazeki et al. |
| 4,429,029 | A | 1/1984 | Hoffmann et al. |
| 4,434,072 | A | 2/1984 | Imahori et al. |
| 4,446,047 | A | 5/1984 | Thompson |
| 4,451,235 | A | 5/1984 | Okuda et al. |
| 4,454,057 | A | 6/1984 | Kaneko et al. |
| 4,456,545 | A | 6/1984 | Weber et al. |
| 4,466,899 | A | 8/1984 | Ditter et al. |
| 4,472,292 | A | 9/1984 | Haas et al. |
| 4,473,486 | A | 9/1984 | Morinaka et al. |
| 4,483,594 | A | 11/1984 | Harrison et al. |
| 4,499,004 | A | 2/1985 | Haas et al. |
| 4,519,935 | A | 5/1985 | Claussen |
| 4,555,355 | A | 11/1985 | Yamada et al. |
| 4,585,574 | A | 4/1986 | Blunck et al. |
| 4,632,781 | A | 12/1986 | Shimidzu et al. |
| 9,701,905 | B2 | 7/2017 | Junge et al. |
| 10,202,508 | B2 | 2/2019 | Tong et al. |
| 10,344,217 | B2 | 7/2019 | Kirsch et al. |
| 10,626,666 | B2 | 4/2020 | Junge et al. |
| 10,738,240 | B2 | 8/2020 | Kirsch et al. |
| 11,760,931 | B2 | 9/2023 | Junge et al. |

(Continued)

FOREIGN PATENT DOCUMENTS

| | | | |
|---|---|---|---|
| CN | 111433322 | A | 7/2020 |
| KR | 20160024772 | A | 3/2016 |

(Continued)

OTHER PUBLICATIONS

International search report PCT/EP2021/084904 dated Mar. 29, 2022 (pp. 1-3).

(Continued)

*Primary Examiner* — Chanceity N Robinson
(74) *Attorney, Agent, or Firm* — Millen, White, Zelano & Branigan, P.C.; Brion P. Heaney

(57) ABSTRACT

A polymerizable LC material containing one or more reactive mesogenic compounds, one or more chiral compounds and one or more compounds of formula I,

I

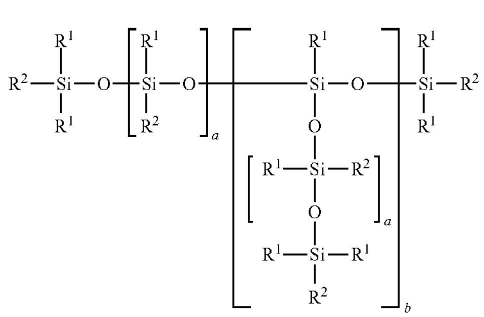

wherein the individual radicals have one of the meaning as defied herein, is suitable for use in in optical, electro-optical, decorative or security devices. Polymer films with improved thermal and UV stability are obtainable from the polymerizable LC material.

17 Claims, No Drawings

(56) References Cited

U.S. PATENT DOCUMENTS

| | | | | |
|---|---|---|---|---|
| 11,762,241 | B2 * | 9/2023 | Junge | E06B 3/6722 349/16 |
| 11,788,009 | B2 | 10/2023 | Verbunt et al. | |
| 2001/0046568 | A1 | 11/2001 | Chandrasekhar et al. | |
| 2006/0106271 | A1 | 5/2006 | Hubbers et al. | |
| 2011/0042651 | A1 | 2/2011 | Koenemann et al. | |
| 2013/0037746 | A1 | 2/2013 | Junge | |
| 2018/0157088 | A1 | 6/2018 | Junge et al. | |
| 2018/0305619 | A1 | 10/2018 | Wilkes et al. | |
| 2019/0016955 | A1 * | 1/2019 | Junge | C09K 19/34 |
| 2019/0162989 | A1 * | 5/2019 | Iglesias | G02F 1/13363 |
| 2021/0181585 | A1 * | 6/2021 | Junge | E06B 3/6722 |
| 2023/0053362 | A1 * | 2/2023 | Junge | C09K 19/3402 |

FOREIGN PATENT DOCUMENTS

| | | | | |
|---|---|---|---|---|
| KR | 20170140360 | A | 12/2017 | |
| TW | 201928021 | A | 7/2019 | |
| WO | 2011134582 | A1 | 11/2011 | |
| WO | 2015090506 | A1 | 6/2015 | |
| WO | WO-2018046421 | A1 * | 3/2018 | C09K 19/04 |

OTHER PUBLICATIONS

Baetens et al."Properties, requirements and possibilities of smart windows for dynamic daylight and solar energy control in buildings: A state-of-the-art review" Solar Energy Materials & Solar Cells_ 2010_ 94_ 87-105.

China National Intellectual Property Administration Office Action dated Feb. 20, 2025 issued in corresponding application 202180082988.9 and English translation.

Taiwan Intellectual Property Office Office Action dated Apr. 10, 2025 issued in corresponding application 110146216 and English translation.

* cited by examiner

DEVICE FOR THE REGULATION OF LIGHT TRANSMISSION

The present invention relates to devices for the regulation of light transmission and in particular to switchable windows. The present invention in particular relates to window elements which comprise electrically switchable optical cells with a switchable layer containing a liquid-crystalline medium having a clearing point which is within the working temperature of the window element. The present invention also relates to liquid-crystalline media for use in the window elements.

Devices for controlling or modulating the transmission of light are commonly used in display applications, but they may also be used e.g. in so-called smart windows applications. R. Baetens et al. in "Properties, requirements and possibilities of smart windows for dynamic daylight and solar energy control in buildings: A state-of-the-art review", Solar Energy Materials & Solar Cells, 94 (2010) on pages 87-105 review different dynamic smart windows. As described therein, smart windows can make use of several technologies for modulating the transmittance of light such as devices based on electrochromism, liquid crystal devices and electrophoretic or suspended-particle devices.

Light shutters and optical intensity modulators, in particular liquid crystal-based light modulators, may be used in switchable windows for architectural, automotive, railway, avionic and nautical applications.

Light modulating or regulating devices may in principle rely on the absorption of light or the scattering of light or a combination of both.

In some devices the transmission of light can be reversibly changed wherein the intensity of incident light can be attenuated, dimmed or tinted. Such devices may thus be operated in and switched between a bright state and a dark state, i.e. between a state of relatively higher light transmission and a state of relatively lower light transmission.

In principle, several modes or configurations may be employed to provide such reversible transmission change. For twisted nematic (TN), super-twisted nematic (STN) and vertical alignment (VA) liquid crystal cells polarizers are commonly used to control the light transmission. It is also possible to use guest-host liquid crystal cells which are based on a liquid crystal host which is doped with dichroic dye molecules. These guest-host systems can be used without any polarizers to alter the light transmission. However, in some embodiments and applications guest-host liquid crystal cells are also used in combination with at least one polarizer.

In other cases a scattering-type device may be used to change the transmission of light by switching between a transparent non-scattering state, i.e. an optically clear or non-hazy state, and a light scattering state, i.e. a translucent or hazy state, which may also be perceived or appear as cloudy, turbid, diffuse or opaque. A device operating in the scattering mode can in particular be used in a privacy window. In this case a privacy mode can be provided when desired by switching the device, in particular the window element, from a clear state with possible viewing contact to a scattering state giving a visual barrier.

Based in principle on a change in phase and optical state by changing the temperature across a phase transition temperature, in particular the clearing point and especially the nematic-isotropic phase transition temperature, switching in liquid crystal-based devices between the different optical states may be thermally controlled, as described e.g. in WO 2011/134582 A1.

In alternative designs liquid crystal-based devices may adopt the different optical states using electrical switching, where the application of voltage controls the switching. Such liquid crystal-based devices in principle employ a change in the orientation of liquid crystal (LC) molecules between two conductive electrodes by applying an electric field which results in a change of the transmittance, as described e.g. in WO 2015/090506 A1.

In US 2019/0162989 A1 multi-layered filter assemblies for smart windows are described, wherein in the dynamic filters a nematic liquid crystal layer is thermally driven or alternatively is electrically driven.

There is still a need in the art for devices for regulating the passage of light and in particular switchable windows which give effective and efficient switching performance.

An object of the present invention is therefore to provide improved devices for regulating the passage of light and in particular window elements comprising optical cells which give reliable and uniform switching, especially at typical working temperatures, while furthermore giving benefits in terms of the ease of configuration as well as energy efficiency. It is a further object to provide liquid-crystalline media which are advantageously useful in these devices. Further objects of the present invention are immediately evident to the person skilled in the art from the following detailed description.

The objects are solved by the subject-matter defined in the independent claims, while preferred embodiments are set forth in the respective dependent claims and are further described below.

The present invention in particular provides the following items including main aspects, preferred embodiments and particular features, which respectively alone and in combination contribute to solving the above objects and eventually provide additional advantages.

A first aspect of the present invention provides a window element, comprising a switchable optical cell which is electrically switchable between at least two optical states and which comprises a switchable layer interposed between two opposing transparent substrates, wherein each substrate is provided with an electrode structure or one of the substrates is provided with two electrode structures and the other substrate is not provided with an electrode, and wherein the switchable layer comprises a liquid-crystalline medium having a clearing point which is within the working temperature of the window element, wherein preferably the clearing point is in the temperature range of from 5° C. to 65° C., more preferably from 15° C. to 45° C.

Preferably and advantageously the switchable optical cell is operable in and switchable between a bright state and a dark state.

In the present invention it has been recognized that it can be advantageous to provide a switchable window element which is based on a liquid crystal cell wherein switching can be controlled both thermally and by applying a voltage or an electric field. Thermal switching can favourably contribute to energy efficiency considering that the switching is based on temperature, e.g. in cases where the switching energy is supplied by the sun as an external source and no further energy input may be needed. Moreover, for temperatures sufficiently below and above the clearing point a respective given optical state may be maintained without the application of an electric field. However, electrical switching can be useful when switching to another optical state is desired at temperatures which are below or even well below the clearing point of the provided switchable layer.

In addition, it has been recognized that the efficiency and effectiveness of thermal switching at or around the clearing point may be enhanced or boosted when it can be supplemented by electrical switching capabilities.

In this respect, it has been found that window elements may have sizes for which temperature gradients may play a role, wherein such temperature gradients may arise from e.g. window frames as heat sinks, non-uniform irradiation from the light source, partial shadowing, etc. Therefore, under certain conditions instead of the desired uniform optical state a non-uniform appearance may be obtained. In particular, considering that in the case of thermal switching control the clearing point is favourably chosen to lie in the usual working temperature range of the switchable window, temperature gradients may result in uneven or non-uniform thermal switching across the window area, resulting in the existence of different optical states in different areas of the window element. Such coexistence of different optical states may detract from the intended visual appearance or aesthetics, e.g. giving a porthole or bull's-eye pattern instead of a uniform rectangular pattern, and it furthermore leads to a generally less effective change of the optical state, e.g. less tinting or dimming of the light intensity overall.

It has presently been found that especially under these circumstances where inhomogeneities in the appearance may potentially occur, it can be beneficial to have the capability to employ electrical switching, at least temporarily, to provide or accelerate switching into the designated state or desired transmission level with the desired uniform appearance. Such alternative or additional optical switching by applying or removing an electric field can thus favourably contribute to the reliability and robustness of the switching into the desired defect-free, uniform optical state.

In contrast to switching merely due to a thermal transition, assisting or complementing the thermal switching with electrical switching can accelerate the transition from one transmission state to another. This provision can also be beneficial in that the clearing point of the LC material may be less tightly controlled and the transition temperature range may be somewhat broader compared to the case of thermal switching alone.

In addition to providing a beneficial switching performance at different temperatures and especially at the most typical working temperatures, the configuration of the window element according to the invention enables both thermal and electrical switching control while advantageously the use of only a single switching layer can be sufficient. This can provide further benefits in terms of an economical use of materials and components and of the ease of assembly of the device.

The present configuration also favourably offers the possibility to use dichroic dyes to give guest-host systems with improved performance.

In addition, a suitably efficient and advantageous optical performance can be obtained, in particular in terms of maintaining a suitable transmittance in the bright state as well as in the dark state, thus giving the possibility to provide a sufficiently high contrast between the switching states.

Based on the favourable optical, electro-optical and thermal performance of the switchable optical cell the present device can be advantageously used in several different window and shutter applications.

In a further aspect the window element according to the invention is used in a window of a building or a vehicle. Vehicles may include e.g. road vehicles such as cars, buses and trucks, as well as trains, boats, ships and airplanes.

In another aspect of the invention a liquid-crystalline medium is provided which can favourably be used in the window element, in particular a liquid-crystalline medium which has a clearing point in the temperature range of from 5° C. to 65° C. and which comprises one or more compounds selected from the group of compounds of the formulae CY, PY and AC

CY

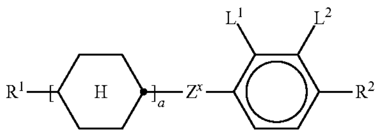

PY

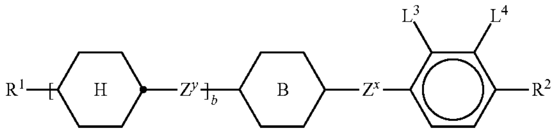

AC

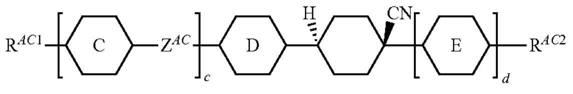

wherein a denotes 1 or 2, b denotes 0 or 1, c denotes 0, 1 or 2, d denotes 0 or 1,

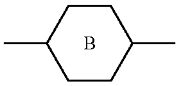

denotes

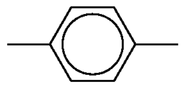

or

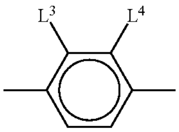

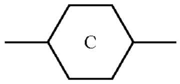

and

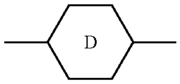

denote

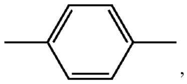

,

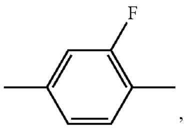

,

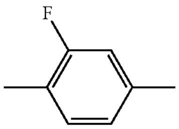

,

-continued

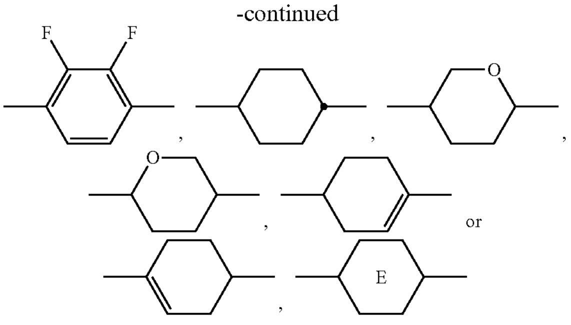

denotes

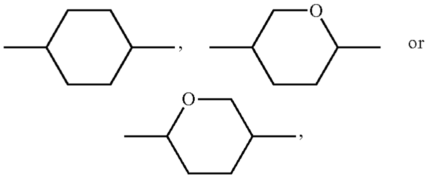

$R^1$, $R^2$, $R^{AC1}$ and $R^{AC2}$ each, independently of one another, denote alkyl having 1 to 12 C atoms, where, in addition, one or two non-adjacent $CH_2$ groups may be replaced by

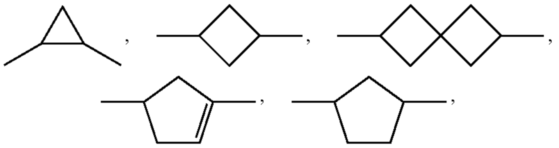

—O—, —CH═CH—, —CO—, —OCO— or —COO— in such a way that O atoms are not linked directly to one another, preferably alkyl or alkoxy having 1 to 6 C atoms, $Z^x$, $Z^y$ and $Z^{AC}$ each, independently of one another, denote —$CH_2CH_2$—, —CH═CH—, —$CF_2O$—, —$OCF_2$—, —$CH_2O$—, —$OCH_2$—, —CO—O—, —O—CO—, —$C_2F_4$—, —CF═CF—, —CH═CH—$CH_2O$— or a single bond, preferably a single bond, and $L^{1-4}$ each, independently of one another, denote F, Cl, CN, $OCF_3$, $CF_3$, $CH_3$, $CH_2F$ or $CHF_2$, preferably F.

Without limiting the present invention thereby, in the following the invention is illustrated by the detailed description of the aspects, embodiments and particular features, and particular embodiments are described in more detail.

The working temperature, in particular the working temperature of the window element, herein refers to an ambient or environmental temperature in which the window element operates and by which the element is affected and actuated. The working temperature thus lies within typical ambient or environmental temperature ranges of the natural surroundings, including solar irradiation, for example between −25° C. and 80° C., and more typically between −15° C. and 70° C. and in particular between −5° C. and 55° C.

The clearing point of the liquid-crystalline medium particularly preferably is within a temperature range that is typically prevalent in interior spaces such as buildings and dwellings. It is preferred that the liquid-crystalline medium as used according to the invention has a clearing point in the temperature range of from 5° C. to 65° C., more preferably from 15° C. to 45° C., and in particular from 30° C. to 40° C.

The clearing point of the liquid-crystalline medium marks the temperature at which a phase transition from a nematic liquid crystalline state or respectively a chiral nematic liquid crystalline state to an isotropic state occurs.

In this respect, for typical liquid-crystalline mixtures comprising several different compounds a clearing temperature range, e.g. a range of a few degrees centigrade, may be observed in which nematic and isotropic phases or domains coexist. In such a case the clearing point of the liquid-crystalline medium is the temperature point at which the completely homogeneous nematic or chiral nematic phase initially transitions into a mixed phase system including one or more isotropic domains.

The clearing point, in particular the phase transition temperature between the nematic or respectively chiral nematic phase and the isotropic phase, can be measured and determined by commonly known methods, e.g. using a Mettler oven or a hot-stage under a polarizing microscope, and herein preferably is determined using a Mettler oven.

It has presently been recognized that for liquid-crystalline media, and in particular for multicomponent systems and especially for multicomponent systems having a broad liquid crystalline phase down to e.g. −20° C. or even −40° C. or below, a clearing temperature range of up to several degrees centigrade may be observed instead of a sharp phase transition. In particular, in this clearing temperature range a mixed phase system with different domains may occur, which can contribute to an undesirable non-uniform appearance of the window element across this temperature range.

It has further been recognized that temperature changes may in some cases be gradual or slow, where a change of a few degrees centigrade may only occur over the course of several minutes or even up to hours. In this case a thermally controlled transition from the nematic state to the isotropic state or vice versa may take a comparatively long time such that a visually inhomogeneous appearance of the window element would potentially persist over an extended period of time, which would detract from the device performance.

According to the invention, in addition or alternatively to the temperature, the optical cell of the window element can be switched electrically. Therefore, electrical switching may advantageously be used especially at temperatures at or around the clearing point of the liquid-crystalline medium in order to accelerate the phase transition into a homogeneous transmission state and to more quickly achieve a uniform device appearance across the entire element area.

In addition, the capability to electrically switch the optical cell is advantageous in that it provides switchability of the window element and thus control of the optical states also in the completely uniform nematic phase, in particular well below the clearing point.

This additional optional switching may be useful for example in cases where light transmission should be regulated quickly or only briefly, for example to reduce temporary glare.

Moreover, in cases where a plurality of window elements are employed, for example in a façade of a building, electrical switching may also be suitably used to specifically address only a single window element or a sub-set of elements, for example when dimming or attenuation of light is only desired in parts of the building.

According to the invention a switchable layer is arranged between two substrates such as to give an optical cell which is operable in different optical states and which may be switched or actuated both electrically and thermally.

The first and second substrates may comprise, preferably consist of, glass or a polymer, in particular glass, polyethylene terephthalate (PET), polyethylene naphthalate (PEN), polyvinylbutyral (PVB), polymethyl methacrylate (PMMA), polycarbonate (PC), polyimide (PI), COP (cyclic olefin polymers) or TAC (triacetylcellulose). In a particularly preferred embodiment glass substrates are used.

Electrical switchability in accordance with the invention is achieved by providing each substrate with an electrode structure or by providing one of the substrates with two electrode structures while the other substrate is not provided with an electrode. It is preferred that each substrate is provided with an electrode structure.

Therefore, in a preferred embodiment the substrates, e.g. glass substrates or plastic substrates, are provided with first and second electrodes. Preferably, electrically conductive layers are provided on the substrates, wherein the conductive layers comprise or are formed of a transparent conductive material, e.g. a transparent conductive oxide, preferably indium tin oxide (ITO), SnO2:F or doped zinc oxide, in particular ITO, or a conductive polymer such as poly(3,4-ethylenedioxythiophene) (PEDOT), poly(3,4-ethylenedioxythiophene) polystyrene sulfonate (PEDOT:PSS) or poly (4,4-dioctyl cyclopentadithiophene), or a thin transparent metal and/or metal oxide layer, for example silver. It is preferred that the transparent conductive material is a transparent conductive oxide, more preferably indium tin oxide. The transparent electrode is preferably applied to the substrate by a coating process. For example, ITO may be sputtered to typically obtain a layer thickness in the range of from 5 nm to 250 nm or a sheet resistance in the range of from 5 Ω/□ to 500 Ω/□.

The electrically conductive layers are preferably provided with electrical connections, in particular busbars. The voltage is preferably supplied by a battery, a rechargeable battery, a supercapacitor or an external current source, more preferably by an external current source. In this respect, bonding of a terminal to a busbar may be achieved by soldering, welding, or use of a conductive adhesive or a conductive film. In particular, anisotropic conductive film bonding may be used to bond a flat cable as a terminal wire to the respective busbar. The terminals may be used to provide a connection to a controller or driver which generates a driving signal for controlling the state of the switchable medium located inside the electro-optical cell. The terminal may, for example, be configured as a terminal wire or a connector for attaching a wire.

The switchable optical cell has at least two optical states. The optical states may, for example, include a bright state and a dark state, or a clear or respectively transparent state and a hazy state, or mixtures of these states.

The window element preferably comprises an optical cell which is switchable between a bright state and a dark state. In this respect, the bright state has a larger degree of light transmission compared to the dark state.

In an embodiment it is particularly preferred that the bright state is present at a relatively lower temperature and that the dark state is present at a relatively higher temperature.

In the bright state the window element according to the invention preferably has a degree of visible light transmission, determined in accordance with DIN EN410, of more than 40%, more preferably more than 50%, and even more preferably more than 65%.

In the dark state the window element according to the invention preferably has a degree of visible light transmission, determined in accordance with DIN EN410, of less than 35%, more preferably less than 30%, and even more preferably less than 20%. In a preferred embodiment, in the dark state the the window element has a degree of visible light transmission, determined in accordance with DIN EN410, in the range from 1% to 35%, more preferably in the range from 2% to 30% and in particular in the range from 5% to 20%.

The visible spectrum herein is defined as light having a wavelength of from 380 nm to 780 nm.

The liquid-crystalline medium as used according to the invention may have a positive dielectric anisotropy or a negative dielectric anisotropy.

In order to enable effective electrical switching the absolute value or the magnitude of the dielectric anisotropy of the liquid-crystalline medium preferably is 2.5 or more, more preferably 3.0 or more and in particular 4.0 or more.

Above and below, Δε denotes the dielectric anisotropy, wherein $\Delta\varepsilon=\varepsilon\|-\varepsilon\perp$. The dielectric anisotropy Δε is preferably determined at 20° C. and 1 kHz.

In a preferred embodiment the liquid-crystalline medium comprises one or more dichroic dyes.

Herein, a dichroic dye is taken to mean a light-absorbing compound in which the absorption properties are dependent on the orientation of the compound relative to the direction of polarisation of the light. A dichroic dye compound in accordance with the present invention typically has an elongated shape, i.e. the compound is significantly longer in one spatial direction, i.e. along the longitudinal axis, than in the other two spatial directions. The dichroic dye absorbs, or respectively preferentially absorbs, light in one orientation so that light transmission may be modulated by changing the orientation of the dichroic dye.

It is thus possible to use guest-host liquid crystal cells which are based on a liquid crystal host which is doped with dichroic dye molecules, wherein these guest-host systems can be used without any polarizers to alter the light transmission.

Each of the one or more dichroic dyes is preferably present in the liquid-crystalline medium in a proportion of 0.005% by weight to 12.5% by weight, more preferably 0.01% by weight to 10% by weight, even more preferably 0.025% by weight to 7.5% by weight, yet even more preferably 0.05% by weight to 5% by weight, still even more preferably 0.1% by weight to 2.5% by weight and particularly preferably 0.25% by weight to 1% by weight, based on the overall weight of the entire medium.

Preferably, the one or more dichroic dyes are present in the liquid-crystalline medium overall in a total concentration which is in the range of 0.01% by weight to 30% by weight, more preferably 0.025% by weight to 25% by weight, even more preferably 0.05% by weight to 15% by weight, still even more preferably 0.1% by weight to 10% by weight and particularly preferably 0.5% by weight to 5% by weight.

The concentration of the dye(s) is preferably chosen such that the proper performance of the obtained modulation material is ensured, in particular in terms of the desired colour and/or dimming effects.

Dichroic dyes may preferably be selected from for example azo dyes, anthraquinones, thiophenolanthraquinones, methine compounds, azomethine compounds, merocyanine compounds, naphthoquinones, tetrazines, pyrromethene dyes, malononitrile dyes, nickel dithiolenes, (metal) phthalocyanines, (metal) naphthalocyanines and (metal) porphyrins, rylenes, in particular perylenes and terylenes, thiadiazole dyes, thienothiadiazole dyes, benzothiadiazoles, thiadiazoloquinoxalines, and diketopyrrolopyrroles. Particular preference is given to azo compounds, anthraquinones, thiophenolanthraquinones, benzothiadiazoles, in particular as described in WO 2014/187529, diketopyrrolopyrroles, in particular as described in WO 2015/090497, thiadiazoloquinoxalines, in particular as described in WO 2016/177449, and rylenes, in particular as described in WO 2014/090373.

The liquid-crystalline medium preferably comprises one, two, three, four, five, six, seven, eight, nine or ten different dichroic dyes, particularly preferably two or three dichroic dyes.

In an embodiment the absorption spectra of the dichroic dyes optionally contained in the medium or respectively the switchable layer preferably complement one another in such a way that the impression of a black colour arises for the eye. Preferably two or more, more preferably three or more dichroic dyes are used in the liquid-crystalline medium to preferably cover a large part of the visible spectrum. The precise way in which a mixture of dyes which appears black or grey to the eye can be prepared is known in the art and is described, for example, in M. Richter, Einführung in die Farbmetrik [Introduction to Colorimetry], 2nd Edition, 1981, ISBN 3-11-008209-8, Walter de Gruyter & Co.

In another embodiment the setting of a different colour is performed, e.g. red, green or blue.

The setting of the colour location of a mixture of dyes is described in the area of colorimetry. To this end, the spectra of the individual dyes are calculated taking into account the Lambert-Beer law to give an overall spectrum and converted into the corresponding colour locations and luminance values under the associated illumination, for example illuminant D65 for daylight, in accordance with the rules of colorimetry. The position of the white point is fixed by the respective illuminant, for example D65, and is quoted in tables, for example in the reference above. Different colour locations can be set by changing the proportions of the various dyes.

In a preferred embodiment three or more different dichroic dyes are comprised in the liquid-crystalline medium.

According to a preferred embodiment, the medium and the switchable layer comprise one or more dichroic dyes which absorb light in the red and NIR region, i.e. at a wavelength of 600 nm to 2000 nm, preferably in the range from 600 nm to 1800 nm, particularly preferably in the range from 650 nm to 1300 nm.

In an embodiment the dichroic dyes which may be provided in the medium and the switchable layer are preferably selected from the dye classes indicated in B. Bahadur, Liquid Crystals—Applications and Uses, Vol. 3, 1992, World Scientific Publishing, Section 11.2.1, and particularly preferably from the explicit compounds given in the table present therein.

Said dyes belong to the classes of dichroic dyes which are known in the art and have been described in the literature. Thus, for example, anthraquinone dyes are described in EP 34832, EP 44893, EP 48583, EP 54217, EP 56492, EP 59036, GB 2065158, GB 2065695, GB 2081736, GB 2082196, GB 2094822, GB 2094825, JP-A 55-123673, DE 3017877, DE 3040102, DE 3115147, DE 3115762, DE 3150803 and DE 3201120, naphthoquinone dyes are described in DE 3126108 and DE 3202761, azo dyes in EP 43904, DE 3123519, WO 82/2054, GB 2079770, JP-A 56-57850, JP-A 56-104984, U.S. Pat. Nos. 4,308,161, 4,308,162, 4,340,973, T. Uchida, C. Shishido, H. Seki and M. Wada: Mol. Cryst. Liq. Cryst. 39, 39-52 (1977), and H. Seki, C. Shishido, S. Yasui and T. Uchida: Jpn. J. Appl. Phys. 21, 191-192 (1982), and perylenes are described in EP 60895, EP 68427 and WO 82/1191. Rylene dyes as described, for example, in EP 2166040, US 2011/0042651, EP 68427, EP 47027, EP 60895, DE 3110960 and EP 698649.

In some embodiments it is preferred that in one of the optical states, in particular in the presence of an electric field, the switchable layer has a twisted or supertwisted configuration.

Therefore, the liquid-crystalline medium may optionally further comprise one or more chiral compounds, in particular one or more chiral dopants.

Chiral compounds and in particular chiral dopants and their concentrations can be provided such that the cholesteric pitch of the liquid crystalline medium may be suitably set or adjusted. The pitch herein means the pitch p of the cholesteric helix, wherein the pitch p is the distance for the orientational axis (director) of the cholesteric liquid crystal to undergo a $2\pi$ rotation. In a preferred embodiment a cholesteric medium is prepared by doping a nematic liquid-crystalline medium with a chiral dopant having a high helical twisting power (HTP). It is also possible to use two or more chiral dopants, for example in order to compensate for the temperature dependence of the HTP of the individual dopants and thus to achieve small temperature dependence of the helix pitch.

Therefore, the liquid-crystalline medium in the switching layer preferably contains one or more chiral compounds and in particular chiral dopants. The chiral dopants preferably have a high absolute value of the HTP and can generally be added in relatively low concentrations to mesogenic base mixtures and have good solubility in the achiral component. If two or more chiral compounds are employed, they may have the same or opposite direction of rotation and the same or opposite temperature dependence of the twist.

Preferably, the one or more chiral compounds optionally contained in the liquid-crystalline medium have an absolute value of the helical twisting power of 5 $\mu m^{-1}$ or more, more preferably of 10 $\mu m^{-1}$ or more and even more preferably of 15 $\mu m^{-1}$ or more, preferably in the commercial liquid crystal mixture MLC 6828 from Merck KGaA. Particular preference is given to chiral compounds having an absolute value of the helical twisting power of 20 $\mu m^{-1}$ or more, more preferably of 40 $\mu m^{-1}$ or more, even more preferably of 60 $\mu m^{-1}$ or more, and most preferably in the range of 80 $\mu m^{-1}$ or more to 260 $\mu m^{-1}$ or less, preferably in the commercial liquid crystal mixture MLC 6828 from Merck KGaA.

Preferably the one or more chiral compounds are contained in the liquid-crystalline medium in an amount, based on the overall contents of the medium, of 2% by weight or less, more preferably 1% by weight or less.

Suitable chiral dopants are known in the art, some of which are commercially available, such as, for example, cholesteryl nonanoate, R/S-811, R/S-1011, R/S-2011, R/S-3011, R/S-4011, R/S-5011, B(OC)2C*H-C-3 or CB15 (all Merck KGaA, Darmstadt, Germany).

Particularly suitable chiral dopants are compounds which contain one or more chiral radicals and one or more mesogenic groups, or one or more aromatic or alicyclic groups which form a mesogenic group with the chiral radical.

In some embodiments the layer thickness d of the switchable layer is purposively set in relation to the pitch p of the medium, where the ratio d/p is preferably in the range of from 0 to 1 and particularly preferably is 0.25 or approximately 0.25.

In another embodiment the ratio d/p is set to be in the range of from 1 to 50.

In a preferred case, the optical state in the presence of an electric field has a twisted nematic (TN) geometry with a twist of 90°. In another preferred case, a supertwisted (STN) configuration, with for example a twist of 240°, may be set.

In a preferred embodiment a liquid-crystalline medium having a negative dielectric anisotropy is provided and used in the switchable layer. Preference is given to liquid-crystalline mixtures having a dielectric anisotropy $\Delta\varepsilon$ in the range from −7 to −2.5, more preferably from −6 to −3.

In order to orient or align liquid crystal molecules at the cell wall or substrate surface it is possible to use alignment layers, also known as orientation layers, to provide an interface which specifically causes or induces a predetermined or desired molecular orientation. In many cases the liquid crystal molecules at or near the interface are on average inclined, even and in particular also in the absence of an applied voltage. In this respect, the average inclination angle of the liquid crystal molecules measured from the cell wall plane or respectively interface plane is called pretilt angle.

In a preferred embodiment the switchable optical cell in the window element has a layer structure comprising in this order a first substrate,
a first electrode layer,
a first alignment layer,
the switchable layer,
a second alignment layer,
a second electrode layer, and
a second substrate.

It is particularly preferred that the first alignment layer and/or the second alignment layer is a homeotropic alignment layer.

Accordingly, it is preferred that in one of the optical states the liquid-crystalline medium in the switchable layer is homeotropically aligned, in particular in the absence of an electric field.

It is particularly preferred that the switchable optical cell is switchable between a bright state and a dark state, wherein below the clearing point and in the absence of an electric field the switchable layer is homeotropically aligned.

It is preferred that the two substrates of the switchable optical cell are arranged such that each of the substrates has at least one region which does not overlap with the other substrate. These non-overlapping regions thus can provide access to the respective transparent electrode and the busbars may be conveniently placed in these non-overlapping regions. The non-overlapping region is preferably an offset between the first and second substrate which is in the range of from 1 mm to 20 mm, preferably from 2 mm to 10 mm and for example about 4 mm.

The liquid-crystalline medium may be included in the electro-optical cell in a suitable manner, for example using vacuum filling or one drop filling. Typically, edge sealants are provided to close the cell or respectively contain the medium. Examples of suitable materials for sealing of the cell include epoxy-based sealants, polyurethanes, hot melt sealants and acrylates.

In the window element and in particular in the switchable optical cell the switchable layer preferably has a thickness of at least 5 μm, more preferably of at least 7 μm, even more preferably of at least 10 μm, still more preferably of at least 15 μm and particularly preferably of at least 20 μm. In an embodiment the switchable layer comprising the liquid-crystalline medium has a thickness in the range of from 5 μm to 100 μm, more preferably from 10 μm to 50 μm, and in particular from 15 μm to 25 μm.

To maintain a proper thickness of the switching layer, spacers may be included within the cell gap of the switching layer. Typically, the spacers have a spherical shape with a diameter in the range of the cell gap. For example, non-conductive spacers having a spherical shape with a predetermined diameter made of polymer or glass may be used. In some embodiments it may be useful to provide sticky spacers, i.e. spacers which have some intrinsic adhesive characteristic to better adhere to the surface. It may also be useful to use black spacers, e.g. to avoid or minimize undesired light leakage. It can be especially beneficial to use spacers which are black and sticky. Alternatively, the cell thickness may be set or maintained by other suitable means, e.g. by using column spacers. The column spacers may also be formed to give compartments, thus optionally allowing for free-cuttable structures.

Herein, the terms film and layer include rigid or flexible, self-supporting or freestanding films or layers with more or less pronounced mechanical stability, as well as coatings or layers on a supporting substrate or between two substrates.

It is also possible to provide passivation or barrier layers on the substrates, e.g. passivation layers comprising silicon oxide or silicon nitride, preferably consisting of silicon oxide or silicon nitride. In this case a passivation layer is arranged on a substrate such that the alignment layer is topmost, i.e. is contacting the LC medium.

It is preferred that the transparent conductive electrode layers are respectively embedded between two transparent dielectric layers. Therefore, according to a particularly preferred embodiment in the optical device a liquid-crystalline medium is provided in a switchable layer, wherein the switchable layer is sandwiched between and in direct contact with a first alignment layer and a second alignment layer, and wherein the electrodes are respectively arranged on a passivation layer and in particular are embedded between two transparent dielectric layers.

In a preferred embodiment the window element contains only a single switchable optical cell. It is also preferred that the switchable optical cell contains only a single switchable layer. It is therefore especially preferred that the window element contains only a single switchable optical cell which contains only a single switchable layer.

It has surprisingly been found that the provision of only a single switchable layer in the window element according to the invention can be sufficient to provide both efficient thermal and electrical switchability, i.e. provide both electrically and thermally controlled or driven switching. This can give benefits in terms of an improved and simplified device configuration and assembly.

However, in alternative embodiments it is also possible to provide two or more switchable layers, e.g. in a so-called double cell configuration, wherein for example two switchable layers or two switchable optical cells according to the invention are included in the window element.

The window element may include further functional layers such as, for example, a UV blocking layer, a low-E layer and/or colour filters.

The optical cell and the window element are preferably characterised in that they do not comprise a polymer-based polarizer, particularly preferably do not comprise a polarizer in the solid material phase and very particularly preferably do not comprise a polarizer at all. Therefore, in a particularly preferred embodiment the device, in particular the window element, does not include a polarizer.

However, in accordance with an alternative embodiment, the device may also comprise one or more polarizers. Therefore, in an embodiment at least one polarization layer and optionally at least one retardation layer is provided in the optical device. The polarizers in this case are preferably linear polarizers. Both absorptive and also reflective polarizers can optionally be employed. Preference is given to the use of polarizers which are in the form of thin optical films.

Therefore, in addition or alternatively to the provision of one or more dichroic dyes in the liquid-crystalline medium, it is possible to provide a window element in which the switchable optical cell further comprises one or more polarizer layers and optionally one or more optical retarder layers.

In a particular alternative it is preferred that the device includes only one polarizer. If precisely one polarizer is present, the Heilmeier-type guest-host arrangement is preferably used. In another alternative, liquid crystal cells with two polarizers, preferably in the absence of any dichroic dyes in the liquid-crystalline medium, are used to control the light transmission.

In an embodiment the window element is configured as or respectively comprised in an insulated glazing unit, preferably as a double glazing or a triple glazing.

It is preferred that the switchable optical cell is arranged in a laminate, wherein preferably a lamination layer is provided which is UV blocking, and wherein preferably the laminate is facing the light source.

This arrangement can contribute to protecting or stabilizing the active material in the switchable layer against degradation by light, in particular UV light.

Preferably, a sufficient thermal contact of the optical cell with the outermost pane or glazing in the window element is provided, where the outermost layer is the energy-incident face of the element. This can be useful to ensure that an external or exterior light source and/or heat source can more effectively influence and affect the thermal switching behaviour of the device.

Preferably, the optical cell contains a first and a second alignment layer. In principle the first alignment layer and the second alignment layer may be formed based on conventional materials and methods.

Preferably, the first alignment layer and the second alignment layer comprise an organic material, more preferably consist of an organic material, wherein in particular the organic material is rubbed, especially mechanically rubbed, or phototreated, especially photoaligned. For example, organic materials such as lecithin and in particular polyimide may be used.

Preferably the first alignment layer and the second alignment layer are polyimide-based layers. Therefore, in a preferred embodiment the alignment layers comprise polyimide, more preferably consist of polyimide. It is also possible to use or to include chemically modified or enhanced polyimide, e.g. azobenzene-containing polyimide. The alignment layers preferably comprising a polyimide may also be rubbed, or may be prepared by a photoalignment method.

The alignment layers, preferably polyimide layers, are preferably arranged such that they provide, in particular at the interface, homeotropic orientation of the molecules of the liquid-crystalline medium. In a particularly preferred embodiment rubbed polyimide layers are used on both substrates.

It is also possible to use polyimide layers prepared by photoalignment, utilizing a light-induced orientational ordering of the alignment surface. This can be achieved through photodecomposition, photodimerisation or photoisomerisation by means of polarized light.

In a preferred embodiment the switchable layer is a homeotropically or vertically aligned liquid-crystalline layer. The liquid-crystalline medium thus preferably has a negative dielectric anisotropy $\Delta\varepsilon$, i.e. perpendicular to the electric field. The medium is therefore switchable into a parallel orientation to the plane of the layer structure by the application of an electric field that is perpendicular to the plane.

Examples for liquid-crystalline media having a negative dielectric anisotropy are given in EP 1 378 558 A1.

The liquid-crystalline medium may include additives. In particular, the liquid-crystalline medium preferably includes an antioxidant or a stabilizer in a concentration of at least 5 ppm.

In a preferred embodiment the LC media comprise 0 to 10% by weight, more preferably 5 ppm to 5% by weight, particularly preferably 10 ppm to 1% by weight, of stabilizers.

Above and below, $\Delta n$ denotes the optical anisotropy, wherein $\Delta n = n_e - n_o$, and wherein preferably the optical anisotropy $\Delta n$ is determined at 20° C. and at a wavelength of 589.3 nm. The liquid-crystalline medium preferably has an optical anisotropy $\Delta n$ in the range of from 0.03 to 0.30, more preferably from 0.04 to 0.27, even more preferably from 0.06 to 0.21 and in particular from 0.09 to 0.16.

All physical properties and physicochemical or electro-optical parameters are determined by generally known methods, in particular according to "Merck Liquid Crystals, Physical Properties of Liquid Crystals", Status Nov. 1997, Merck KGaA, Germany and are given for a temperature of 20° C., unless explicitly stated otherwise.

Herein, unless explicitly stated otherwise, all concentrations are given in weight percent and relate to the respective complete mixture.

Transmission and scattering of light preferably refer to the transmission and scattering of electromagnetic radiation in the spectral range from 380 nm to 780 nm.

In addition, the liquid-crystalline media preferably exhibit a favourable low temperature stability without visible crystallisation or decomposition, in particular a long shelf life of more than 200 hours measured in bulk at −40° C.

Preferably, the liquid crystalline-medium as used according to the invention comprises one or more compounds selected from the group of compounds of the formulae CY, PY and AC

CY

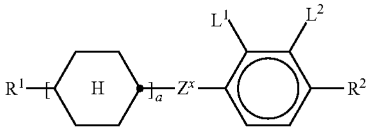

PY

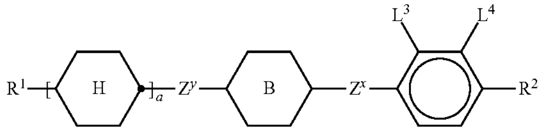

AC

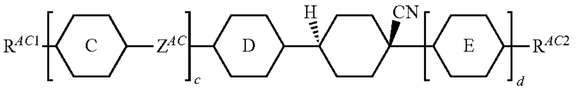

wherein a denotes 1 or 2, b denotes 0 or 1, c denotes 0, 1 or 2, d denotes 0 or 1,

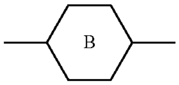

denotes

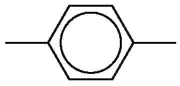

or

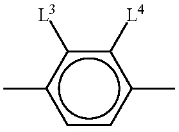

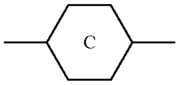

and

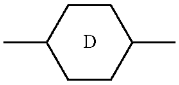

denote

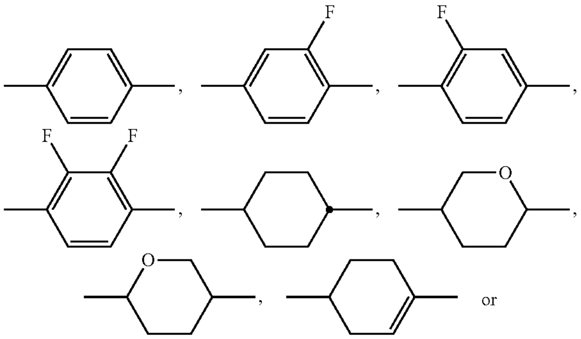

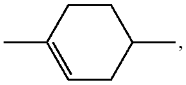

,

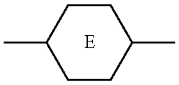

denotes

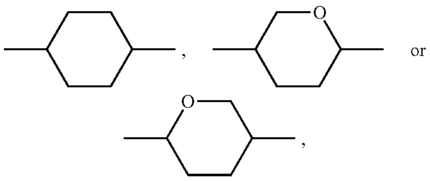

$R^1$, $R^2$, $R^{AC1}$ and $R^{AC2}$ each, independently of one another, denote alkyl having 1 to 12 C atoms, where, in addition, one or two non-adjacent $CH_2$ groups may be replaced by

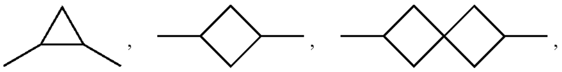

-continued

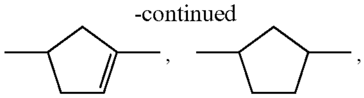

—O—, —CH═CH—, —CO—, —OCO— or —COO— in such a way that O atoms are not linked directly to one another, preferably alkyl or alkoxy having 1 to 6 C atoms, $Z^x$, $Z^y$ and $Z^{AC}$ each, independently of one another, denote $—CH_2CH_2—$, —CH═CH—, $—CF_2O—$, $—OCF_2—$, $—CH_2O—$, $—OCH_2—$, —CO—O—, —O—CO—, $—C_2F_4—$, —CF═CF—, $—CH═CH—CH_2O—$ or a single bond, preferably a single bond, and $L^{1-4}$ each, independently of one another, denote F, Cl, CN, $OCF_3$, $CF_3$, $CH_3$, $CH_2F$ or $CHF_2$, preferably F.

Preferably, both $L^1$ and $L^2$ denote F or one of $L^1$ and $L^2$ denotes F and the other denotes Cl, and both $L^3$ and $L^4$ denote F or one of $L^3$ and $L^4$ denotes F and the other denotes Cl.

Herein

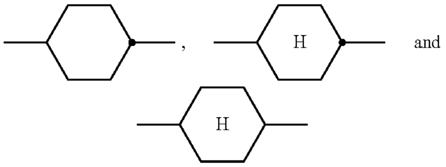

denote trans-1,4-cyclohexylene.

It is particularly preferred that the liquid-crystalline medium as used according to the invention contains the one or more compounds selected from the compounds of the formulae CY, PY and AC in an amount, based on the overall contents of the medium, of at least 20% by weight, more preferably at least 25% by weight, even more preferably at least 30% by weight, still more preferably at least 35% by weight, yet more preferably at least 40% by weight and particularly preferably at least 50% by weight.

The compounds of the formula CY are preferably selected from the group of compounds of the following formulae:

CY1

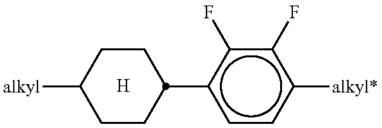

CY2

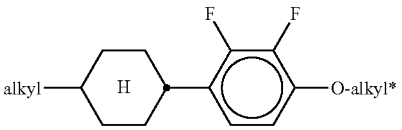

CY3

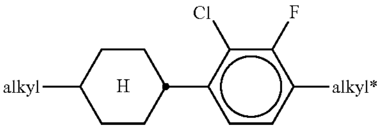

CY4

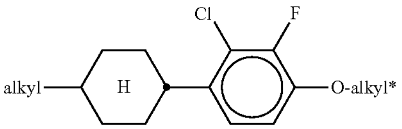

-continued
CY5
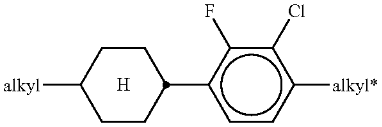
CY6
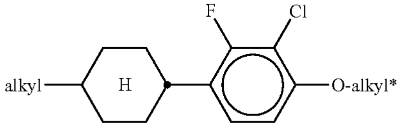
CY7
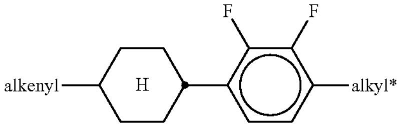
CY8
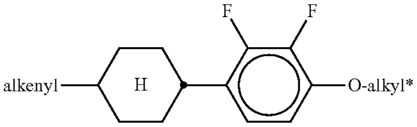
CY9
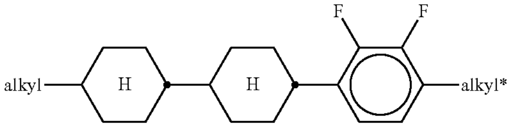
CY10
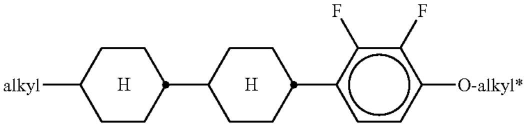
CY11
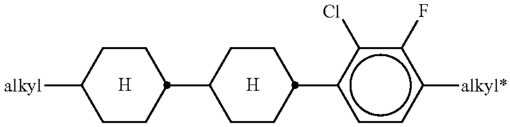
CY12
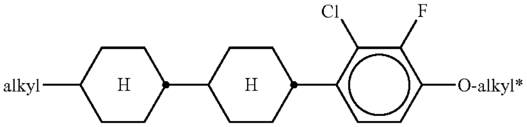
CY13
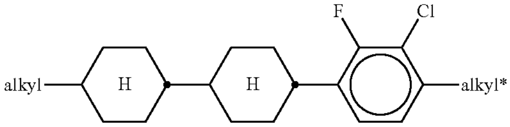
CY14
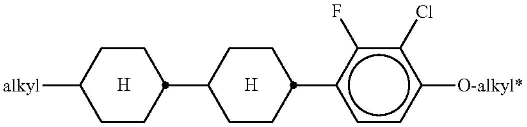
-continued
CY15
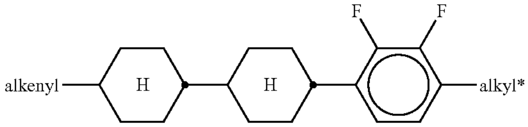
CY16
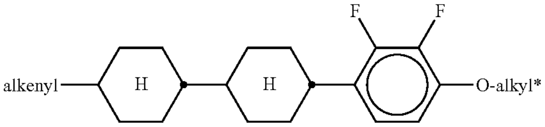
CY17
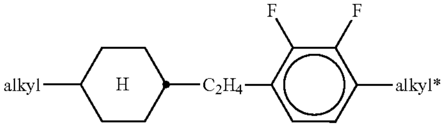
CY18
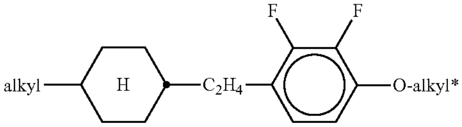
CY19
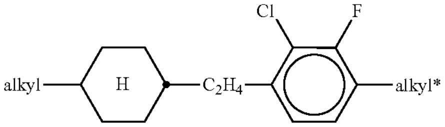
CY20
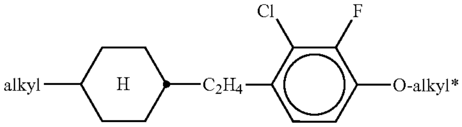
CY21
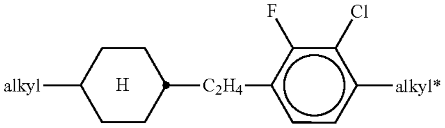
CY22
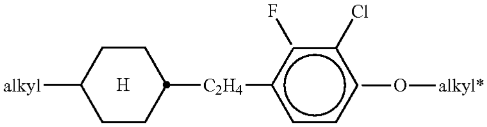
CY23
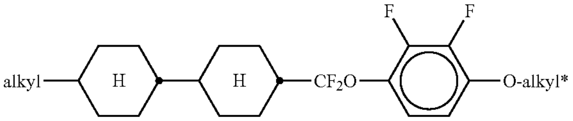
CY24
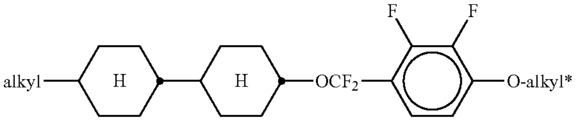
CY25
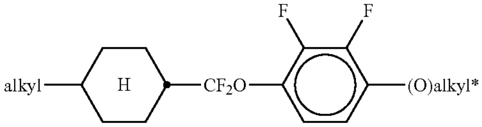

-continued

CY26

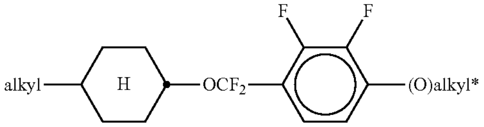

CY27

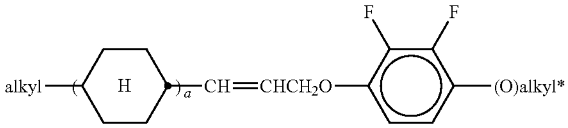

CY28

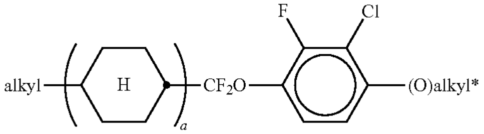

CY29

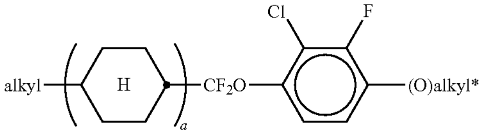

CY30

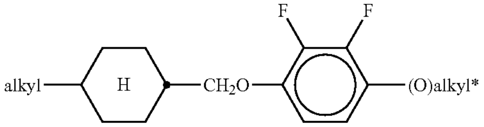

CY31

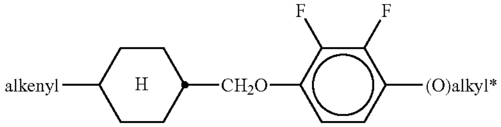

CY32

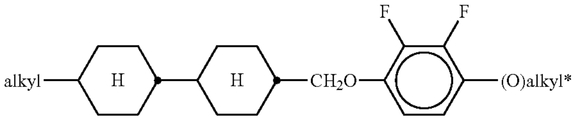

CY33

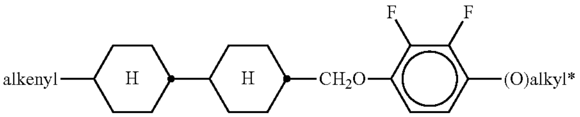

wherein a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2{=}CH—$, $CH_2{=}CHCH_2CH_2—$, $CH_3—CH{=}CH—$, $CH_3—CH_2—CH{=}CH—$, $CH_3—(CH_2)_2—CH{=}CH—$, $CH_3—(CH_2)_3—CH{=}CH—$ or $CH_3—CH{=}CH—(CH_2)_2—$.

The compounds of the formula PY are preferably selected from the group of compounds of the following formulae:

PY1

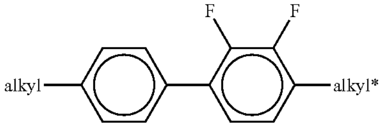

PY2

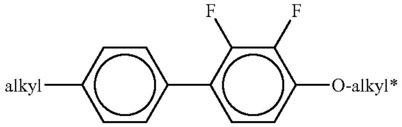

PY3

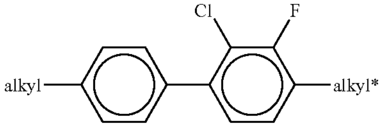

PY4

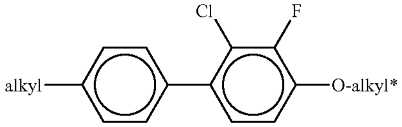

PY5

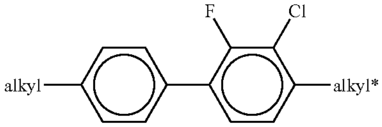

PY6

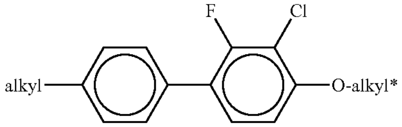

PY7

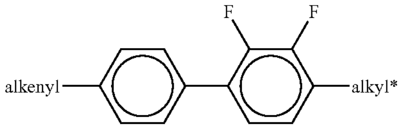

PY8

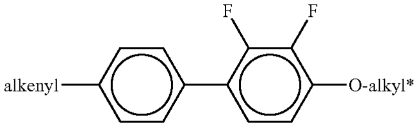

PY9

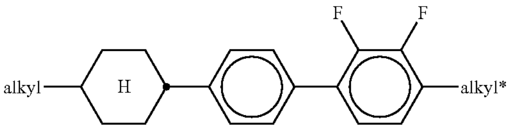

PY10

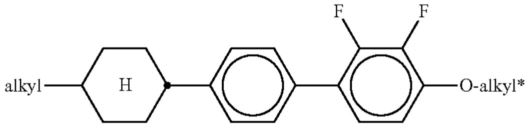

PY11

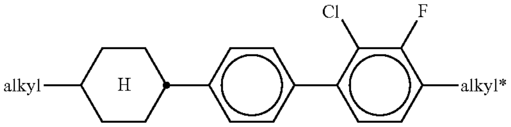

-continued

PY12

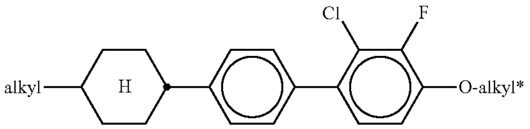

PY13

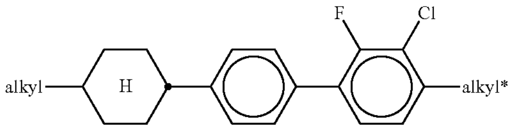

PY14

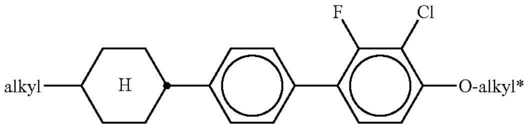

PY15

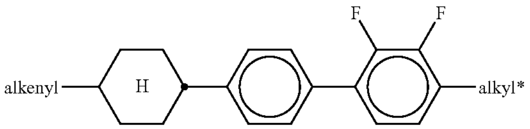

PY16

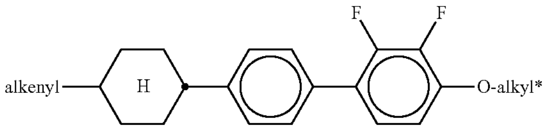

PY17

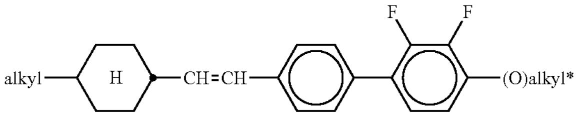

PY18

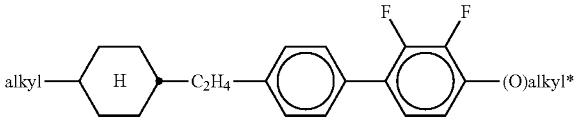

PY19

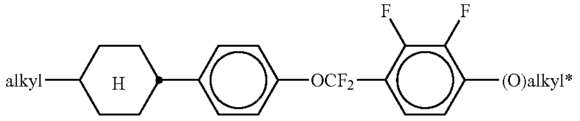

PY20

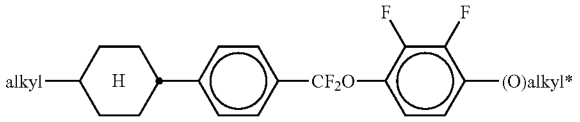

PY21

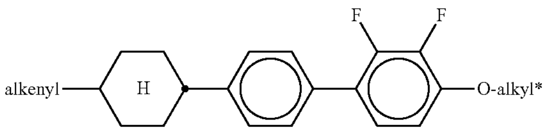

wherein alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2{=}CH—$, $CH_2{=}CHCH_2CH_2—$, $CH_3—CH{=}CH—$, $CH_3—CH_2—CH{=}CH—$, $CH_3—(CH_2)_2—CH{=}CH—$, $CH_3—(CH_2)_3—CH{=}CH—$ or $CH_3—CH{=}CH—(CH_2)_2—$.

The compounds of the formula AC are preferably selected from the group of compounds of the following formulae:

AC1

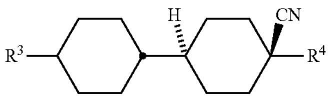

AC2

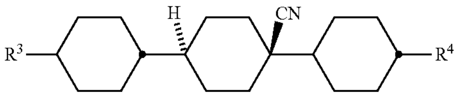

AC3

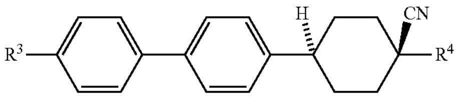

wherein $R^3$ and $R^4$ have the meanings of $R^{AC1}$ and $R^{AC2}$ as set forth above.

It is particularly preferred that the liquid-crystalline medium comprises one or more compounds selected from the group of compounds of the formulae CY-a and AC-a CY-a

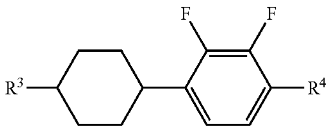

AC-a

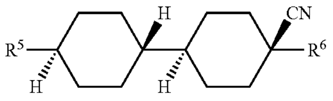

wherein $R^3$, $R^4$, $R^5$ and $R^6$ each, independently of one another, denote alkyl having 1 to 12 C atoms, where, in addition, one or two non-adjacent $CH_2$ groups may be replaced by

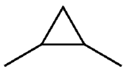, 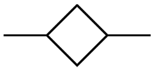, 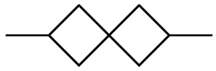, 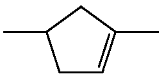, 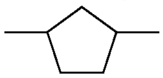,

—O—, —CH═CH—, —CO—, —OCO— or —COO— in such a way that O atoms are not linked directly to one another, and wherein preferably $R^3$, $R^5$ and $R^6$ each, independently of one another, denote alkyl having 1 to 6 C atoms and preferably $R^4$ denotes alkoxy having 1 to 6 C atoms.

In an embodiment one or both of groups $R^5$ and $R^6$ in formula Ac-a are cyclic alkyl, in particular selected from cyclopropyl, cyclobutyl and cyclopentyl.

Preferably, the liquid crystalline-medium as used according to the invention further comprises one or more compounds of formula I

I

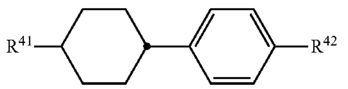

in which $R^{41}$ and $R^{42}$ each, independently of one another, denote alkyl having 1 to 12 C atoms, where, in addition, one or two non-adjacent $CH_2$ groups may be replaced by

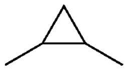, 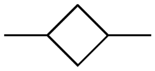, 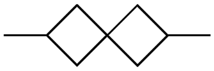,

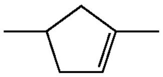, 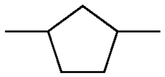,

—O—, —CH═CH—, —CO—, —OCO— or —COO— in such a way that O atoms are not linked directly to one another.

The compounds of the formula I are preferably selected from the group of compounds of the following formulae:

I-1

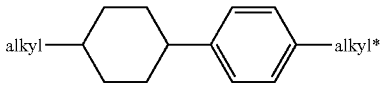

I-2

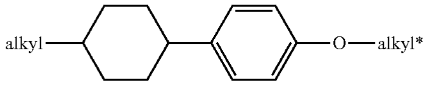

I-3

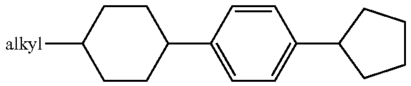

I-4

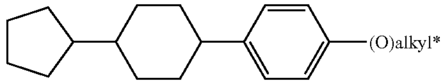

I-5

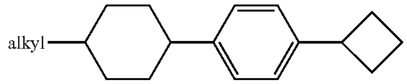

I-6

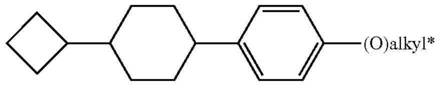

I-7

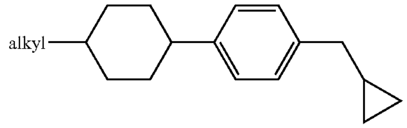

I-8

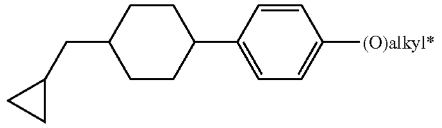

wherein alkyl and alkyl* each, independently of one another, denote a straight-chain alkyl radical having 1-6 C atoms, and (O) denotes an oxygen atom or a single bond.

The mesogenic compounds described above and below are either known or can be prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se, but are not mentioned here in greater detail. The media according to the invention are prepared in a manner conventional per se. In general, the components are dissolved in one another, preferably at elevated temperature. Suitable additives or substances can be added to modify the dielectric anisotropy, the viscosity and/or the alignment of the liquid-crystalline phases.

The term "alkyl" according to the present invention preferably encompasses straight-chain and branched alkyl groups, preferably having 1 to 7 carbon atoms, particularly the straight-chain groups methyl, ethyl, propyl, butyl, pentyl, hexyl and heptyl. Groups having 2 to 5 carbon atoms are generally preferred.

An alkoxy can be straight-chain or branched, and it preferably is straight-chain and has 1, 2, 3, 4, 5, 6 or 7 carbon atoms, and accordingly is preferably methoxy, ethoxy, propoxy, butoxy, pentoxy, hexoxy or heptoxy.

The term "alkenyl" according to the present invention preferably encompasses straight-chain and branched alkenyl groups, preferably having 2-7 carbon atoms, in particular the straight-chain groups. Particularly preferred alkenyl groups are $C_2$-$C_7$-1E-alkenyl, $C_4$-$C_7$-3E-alkenyl, $C_5$-$C_7$-4E-alkenyl, $C_6$-$C_7$-5E-alkenyl and $C_7$-6E-alkenyl, in particular $C_2$-$C_7$-1 E-alkenyl, $C_4$-$C_7$-3E-alkenyl and $C_5$-$C_7$-4E-alkenyl. Examples of preferred alkenyl groups are vinyl, 1 E-propenyl, 1 E-butenyl, 1 E-pentenyl, 1 E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl and 6-heptenyl. Groups having up to 5 carbon atoms are generally preferred.

Fluorinated alkyl or alkoxy preferably comprises $CF_3$, $OCF_3$, $CFH_2$, $OCFH_2$, $CF_2H$, $OCF_2H$, $C_2F_5$, $OC_2F_5$, $CFHCF_3$, $CFHCF_2H$, $CFHCFH_2$, $CH_2CF_3$, $CH_2CF_2H$, $CH_2CFH_2$, $CF_2CF_2H$, $CF_2CFH_2$, $OCFHCF_3$, $OCFHCF_2H$, $OCFHCFH_2$, $OCH_2CF_3$, $OCH_2CF_2H$, $OCH_2CFH_2$, $OCF_2CF_2H$, $OCF_2CFH_2$, $C_3F_7$ or $OC_3F_7$, in particular $CF_3$, $OCF_3$, $CF_2H$, $OCF_2H$, $C_2F_5$, $OC_2F_5$, $CFHCF_3$, $CFHCF_2H$, $CFHCFH_2$, $CF_2CF_2H$, $CF_2CFH_2$, $OCFHCF_3$, $OCFHCF_2H$, $OCFHCFH_2$, $OCF_2CF_2H$, $OCF_2CFH_2$, $C_3F_7$ or $OC_3F_7$, particularly preferably $OCF_3$ or $OCF_2H$. Fluoroalkyl in a preferred embodiment encompasses straight-chain groups with terminal fluorine, i.e. fluoromethyl, 2-fluoroethyl, 3-fluoropropyl, 4-fluorobutyl, 5-fluoropentyl, 6-fluorohexyl and 7-fluoroheptyl. Other positions of fluorine are not precluded, however.

Oxaalkyl preferably encompasses straight-chain groups of the formula $C_nH_{2n+1}$—O—$(CH_2)_m$, where n and m are each, independently of one another, from 1 to 6. Preferably, n=1 and m is 1 to 6.

Oxaalkyl is preferably straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxadecyl.

Halogen is preferably F or Cl, in particular F.

If one of the above-mentioned groups is an alkyl group in which one $CH_2$ group has been replaced by —CH═CH—, this can be straight-chain or branched. It is preferably straight-chain and has 2 to 10 carbon atoms. Accordingly, it is in particular vinyl, prop-1- or prop-2-enyl, but-1-, -2- or but-3-enyl, pent-1-, -2-, -3- or pent-4-enyl, hex-1-, -2-, -3-, -4- or hex-5-enyl, hept-1-, -2-, -3-, -4-, -5- or hept-6-enyl, oct-1-, -2-, -3-, -4-, -5-, -6- or oct-7-enyl, non-1-, -2-, -3-, -4-, -5-, -6-, -7- or non-8-enyl, dec-1-, -2-, -3-, -4-, -5-, -6-, -7-, -8- or dec-9-enyl.

If one of the above-mentioned groups is an alkyl group in which one $CH_2$ group has been replaced by —O— and one has been replaced by —CO—, these are preferably adjacent. These thus contain an acyloxy group —CO—O— or an oxycarbonyl group —O—CO—. These are preferably straight-chain and have 2 to 6 carbon atoms. They are accordingly in particular acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxyethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl) propyl, 3-(ethoxycarbonyl) propyl or 4-(methoxycarbonyl) butyl.

If one of the above-mentioned groups is an alkyl group in which one $CH_2$ group has been replaced by unsubstituted or substituted —CH═CH— and an adjacent $CH_2$ group has been replaced by CO, CO—O or O—CO, this can be straight-chain or branched. It is preferably straight-chain and has 4 to 13 carbon atoms. Accordingly, it is in particular acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl or 9-methacryloyloxynonyl.

If one of the above-mentioned groups is an alkyl or alkenyl group which is monosubstituted by CN or $CF_3$, this group is preferably straight-chain. The substitution by CN or $CF_3$ is in any position.

If one of the above-mentioned groups is an alkyl or alkenyl group which is at least monosubstituted by halogen, this group is preferably straight-chain and halogen is preferably F or Cl, more preferably F. In the case of polysubstitution, halogen is preferably F. The resulting groups also include perfluorinated groups. In the case of monosubstitution, the fluoro or chloro substituent can be in any desired position, but is preferably in the ω-position.

Compounds containing branched groups may occasionally be of importance owing to better solubility in some conventional liquid-crystalline base materials. However, they are particularly suitable as chiral dopants if they are optically active.

Branched groups of this type generally contain not more than one chain branch. Preferred branched groups are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexoxy, 1-methylhexoxy or 1-methylheptoxy.

If one of the above-mentioned groups is an alkyl group in which two or more $CH_2$ groups have been replaced by —O— and/or —CO—O—, this can be straight-chain or branched. It is preferably branched and has 3 to 12 carbon atoms. Accordingly, it is in particular biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis(methoxycarbonyl)methyl, 2,2-bis(methoxycarbonyl)ethyl, 3,3-bis(methoxycarbonyl)propyl, 4,4-bis(methoxycarbonyl)butyl, 5,5-bis(methoxycarbonyl)pentyl, 6,6-bis(methoxycarbonyl)hexyl, 7,7-bis(methoxycarbonyl)heptyl, 8,8-bis(methoxycarbonyl)octyl, bis(ethoxycarbonyl)methyl, 2,2-bis(ethoxycarbonyl)ethyl, 3,3-bis(ethoxycarbonyl)propyl, 4,4-bis(ethoxycarbonyl) butyl or 5,5-bis(ethoxycarbonyl)pentyl.

In addition to a suitably high optical anisotropy, the liquid-crystalline medium comprised in the switchable layer can advantageously exhibit a favourably high voltage holding ratio (VHR) in combination with good light stability.

In a particular embodiment the switchable layer is polymer stabilized. It has surprisingly been found that polymer stabilization can favourably contribute to obtaining and maintaining over time the optical states having the desired alignment and configuration.

In this respect, preferably one or more polymerizable, curable or hardenable compounds are provided in the liquid-crystalline medium, preferably one or more photocurable monomers, as the precursors for the polymeric component used for polymer stabilization and these reactive compounds are subsequently polymerized in situ.

Therefore, in an embodiment one or more polymerizable compounds are comprised in the liquid-crystalline medium as the precursors for the polymer used for polymer stabilizazion. In an embodiment polymerizable mesogenic or liquid-crystalline compounds, also known as reactive mesogens (RMs) or mesogenic monomers, are used.

The optical cell and the window element may have different shapes, e.g. square, rectangular, triangular or polygonal. The window element may for example be contained or arranged in a double glazing unit or a triple glazing unit and in particular in insulated glazing units. The window element can suitably and favourably be used in a building or a vehicle.

It is preferred that the switchable optical cell contains only a single switching layer. In an embodiment of the invention the window element contains precisely one switchable optical cell.

However, in an alternative the window element comprises an additional switchable optical cell. In this latter case two switching layers are provided separately or individually in optical cells, which are then combined and configured as a so-called double cell, in particular by bonding using e.g. lamination or an adhesive.

The window element preferably has an area of at least 100 $cm^2$, more preferably of at least 1600 $cm^2$ and even more preferably of at least 10000 $cm^2$. In addition, it is preferred that the switchable layer is unsegmented or that in the alternative case where the switchable layer is segmented into compartments said compartments each have an area of at least 1 $cm^2$, more preferably of at least 10 $cm^2$ and even more preferably of at least 50 $cm^2$. Compared to conventional liquid crystal displays which exhibit a large multitude of microscopically small pixels, the window element typically comprises extended continuous LC material areas and likewise extended uniform electrode areas.

The following examples are merely illustrative of the present invention and they should not be considered as limiting the scope of the invention in any way. The examples and modifications or other equivalents thereof will become apparent to those skilled in the art in the light of the present disclosure.

However, the physical properties and compositions shown in the following illustrate which properties can be achieved and in which ranges they can be modified. Especially the combination of the various properties, which can be preferably achieved, is thus well defined.

EXAMPLES

The following liquid-crystalline mixtures are prepared and investigated.

Example 1

A mixture M-1 having the following composition is prepared.

CP-5-3

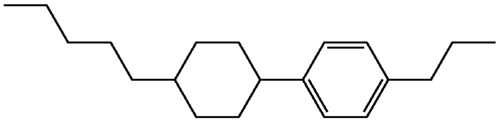

20.00%

CCN-47

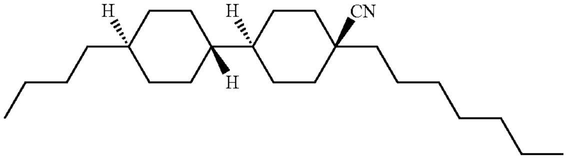

32.00%

-continued

CCN-55

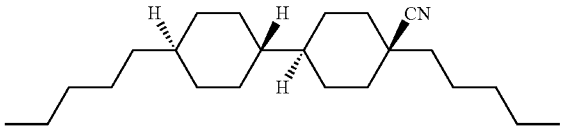

32.00%

CCN-33

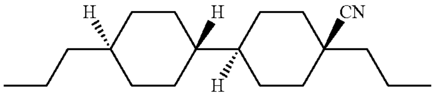

16.00%

The mixture M-1 has a clearing point of 36.0° C.

Example 2

A mixture M-2 is prepared by mixing 99.70% of mixture M-1 with 0.30% of the compound of formula

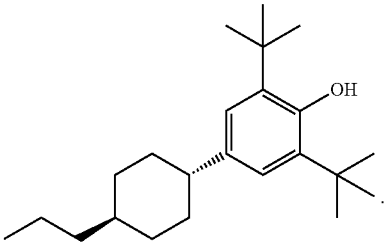 [SMILES: CCC[C@H]1CC[C@H](c2cc(C(C)(C)C)c(O)c(C(C)(C)C)c2)CC1]

Example 3

A mixture M-3 is prepared by mixing 96.914% of mixture M-1, 0.544% of the compound of formula

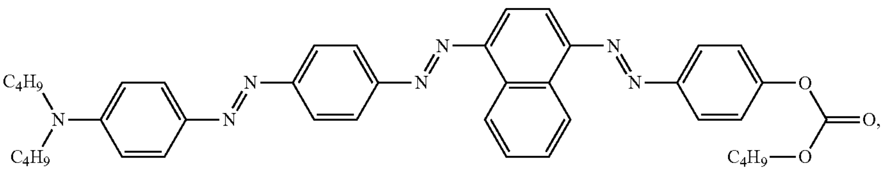

1.152% of the compound of formula

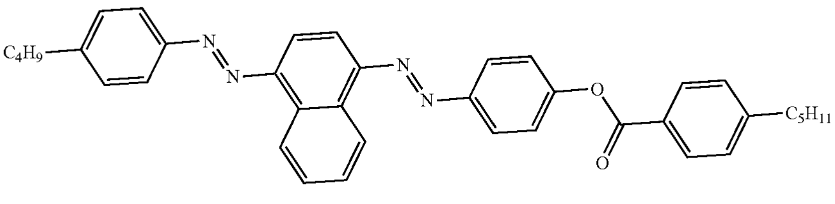

and 1.390% of the compound of formula

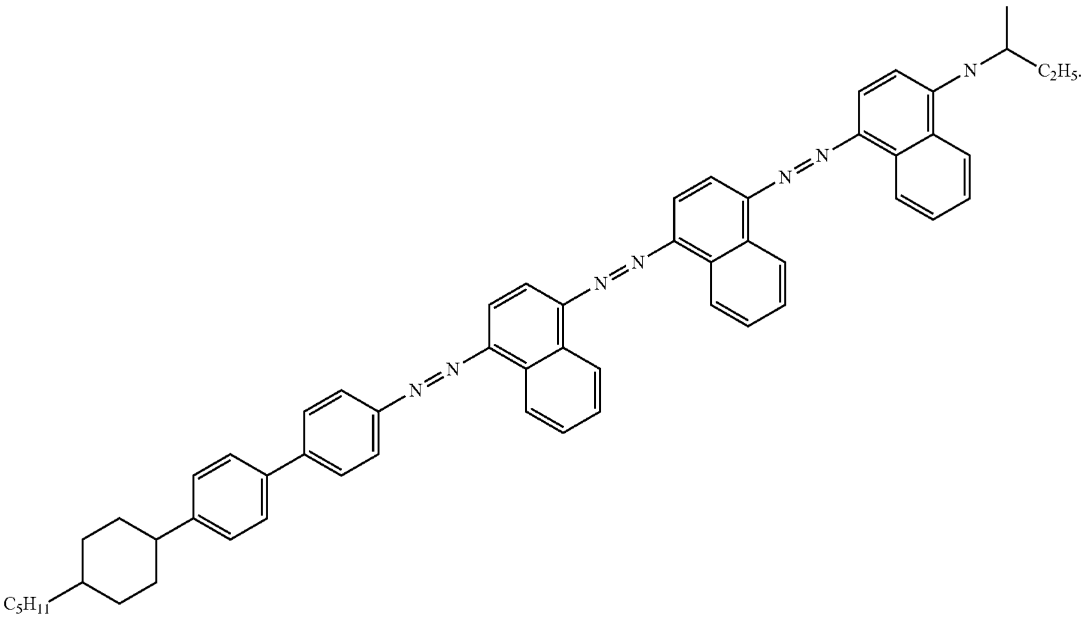

The mixture M-3 has a clearing point of 41.6° C.

The mixture M-3 is filled into an electro-optical cell having glass substrates with ITO electrodes as well as polyimide alignment layers giving homeotropic alignment, wherein the cell gap is 25 μm.

The thermal and electrical switching performance is investigated using a heating plate and a spectrometer as well as a microscope hot-stage system.

In the absence of an electric field the liquid-crystalline medium in the electro-optical cell at room temperature has a nematic phase giving a uniform bright state appearance of the device. The clearing point is observed at 41.6° C. At this temperature the nematic phase starts to transition into a multiphase system where dark droplets of isotropic medium are embedded in bright nematic domains. This clearing temperature region in which nematic and isotropic domains coexist is present from 41.6° C. to 44° C., wherein a non-uniform visual appearance of the device is observed.

The cell is electrically switched (30 V) in this temperature region of 41.6° C. to 44° C. and the nematic domains quickly switch into a dark state such that the device overall is giving a uniform dark appearance.

To give an especially improved switching performance and an aesthetically favourable appearance electrical switching is performed at temperatures just below the clearing point, in particular between 40.5° C. and 41.5° C.

In addition, electrical switching at room temperature gives a quick transition between a bright state and a dark state with excellent contrast and uniformity.

Electro-optical cells filled with the mixture M-3 are included in window elements by lamination.

Example 4

A dye-doped mixture M-4 is prepared analogous to Example 3, wherein instead of mixture M-1 the mixture M-2 is used.

Example 5

A mixture M-5 having the following composition is prepared.

| | |
|---|---|
| CP-5-3 | 10.00% |
| CCN-47 | 36.00% |
| CCN-55 | 36.00% |
| CCN-33 | 18.00% |

A mixture M-5-1 is prepared by mixing 99.70% of mixture M-5 with 0.03% of the compound of formula

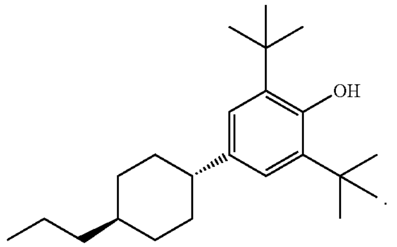 [SMILES: CCC[C@H]1CC[C@H](c2cc(C(C)(C)C)c(O)c(C(C)(C)C)c2)CC1]

A mixture M-5-2 is prepared by mixing 99.51% of mixture M-5 and 0.49% of chiral dopant S-811 available from Merck KGaA, Darmstadt, Germany.

Example 6

A mixture M-6 is prepared by mixing 96.914% of mixture M-5, 0.544% of the compound of formula

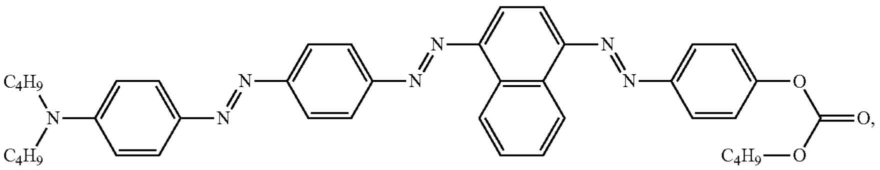

1.152% of the compound of formula

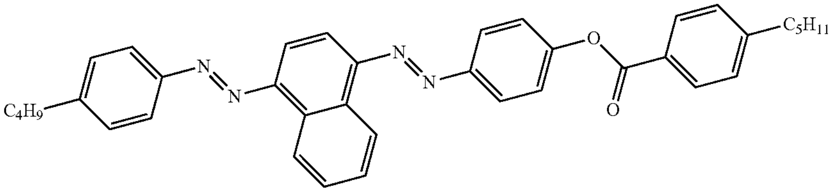

and 1.390% of the compound of formula

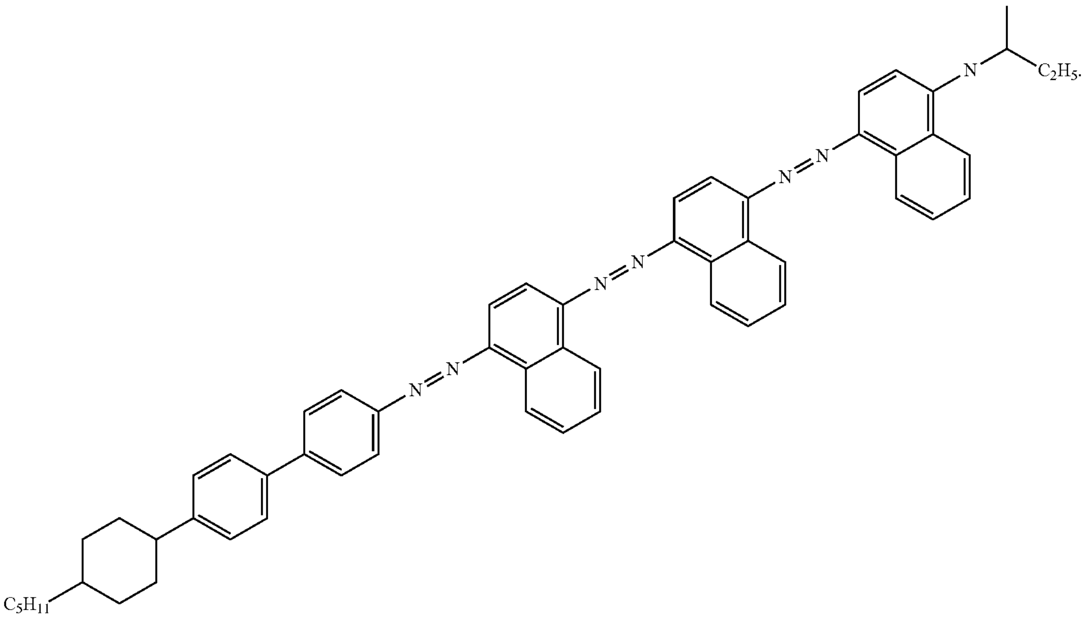

The mixture M-6 has a clearing point of 50.5° C.

The mixture M-6 is filled into an electro-optical cell having glass substrates with ITO electrodes as well as polyimide alignment layers giving homeotropic alignment, wherein the cell gap is 25 μm.

The thermal and electrical switching performance is investigated using a heating plate and a spectrometer as well as a microscope hot-stage system.

In the absence of an electric field the liquid-crystalline medium in the electro-optical cell at room temperature has a nematic phase giving a uniform bright state appearance of the device. The clearing point is observed at 50.5° C. At this temperature the nematic phase starts to transition into a multiphase system where dark droplets of isotropic medium are embedded in bright nematic domains. The clearing temperature region in which nematic and isotropic domains coexist is present from 50.5° C. to 53° C., wherein a non-uniform visual appearance of the device is observed.

The cell is electrically switched (30 V) in this temperature region of 50.5° C. to 53° C. and the nematic domains quickly switch into a dark state such that the device overall is giving a uniform dark appearance.

To give an especially improved switching performance and an aesthetically favourable appearance electrical switching is performed at temperatures just below the clearing point, in particular between 49.4° C. and 50.4° C.

In addition, electrical switching at room temperature gives a quick transition between a bright state and a dark state with excellent contrast and uniformity.

Electro-optical cells filled with the mixture M-6 are included in window elements by lamination.

Examples 7 and 8

Dye-doped mixtures M-7 and M-8 are prepared analogous to Example 6, wherein instead of mixture M-5 the mixtures M-5-1 and M-5-2 are respectively used.

The invention claimed is:

1. A window element, comprising:

a switchable optical cell which is arranged in a laminate, wherein the switchable optical cell is electrically switchable between at least two optical states, and the switchable optical cell comprises a switchable layer interposed between two opposing transparent substrates, wherein each substrate is provided with an electrode structure or one of the substrates is provided with two electrode structures and the other substrate is not provided with an electrode, wherein the switchable layer comprises a liquid-crystalline medium having a clearing point in the temperature range of from 15° C. to 45° C., and wherein the working temperature range of the window element is between −5° C. to 55°C., and wherein the switchable optical cell can be switched both electrically and thermally.

2. The window element according to claim 1, wherein the absolute value of a dielectric anisotropy of the liquid-crystalline medium is 2.5 or more.

3. The window element according to claim 1, wherein the liquid-crystalline medium comprises one or more dichroic dyes.

4. The window element according to claim 1, wherein the liquid-crystalline medium comprises a chiral dopant.

5. The window element according to claim 1, wherein the liquid-crystalline medium has a negative dielectric anisotropy.

6. The window element according to claim 1, wherein the switchable optical cell has a layer structure comprising in this order a first substrate,
a first electrode layer,
a first alignment layer,
the switchable layer,
a second alignment layer,
a second electrode layer, and
a second substrate.

7. The window element according to claim 6, wherein the first alignment layer and/or the second alignment layer is a homeotropic alignment layer.

8. The window element according to claim 1, wherein the switchable optical cell is switchable between a bright state and a dark state, and wherein below the clearing point and in the absence of an electric field the switchable layer is homeotropically aligned.

9. The window element according to claim 1, wherein the element is configured as an insulated glazing unit.

10. The window element according to claim 1, wherein the liquid-crystalline medium comprises one or more compounds selected from the group of compounds of the formulae CY, PY and AC

CY

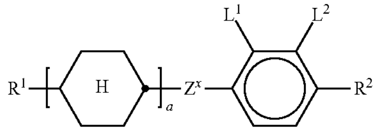

PY

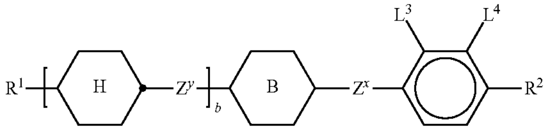

AC

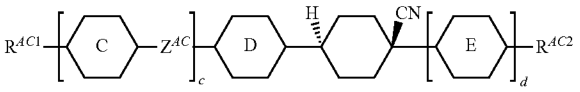

wherein a denotes 1 or 2, b denotes 0 or 1, c denotes 0, 1 or 2, d denotes 0 or 1,

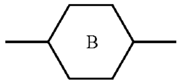

denotes

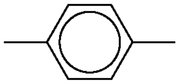 or 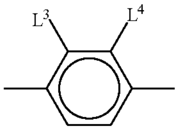

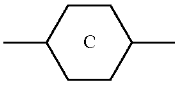 and 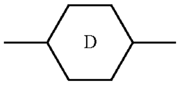

denote

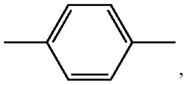 , 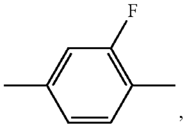 , 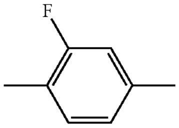 ,

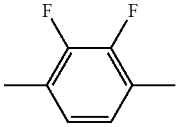 , 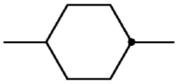 , 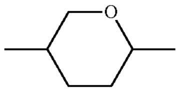 ,

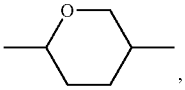 , 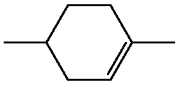 or

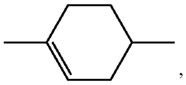 , 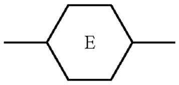

denotes

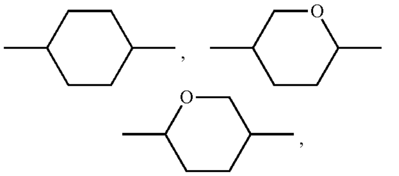

or $R^1$, $R^2$, $R^{AC1}$ and $R^{AC2}$ each, independently of one another, denote alkyl having 1 to 12 C atoms, where, in addition, one or two non-adjacent $CH_2$ groups may each be replaced by

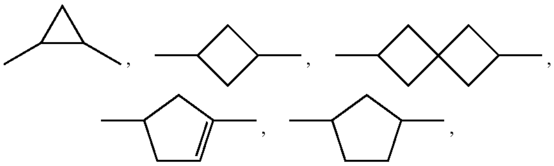

—O—, —CH═CH—, —CO—, —OCO— or —COO— in such a way that O atoms are not linked directly to one another, $Z^x$, $Z^y$ and $Z^{AC}$ each, independently of one another, denote —$CH_2CH_2$—, —CH═CH—, —$CF_2O$—, —$OCF_2$—, —$CH_2O$—, —$OCH_2$—, —CO—O—, —O—CO—, —$C_2F_4$—, —CF═CF—, —CH═CH—$CH_2O$—, or a single bond, and $L^{1-4}$ each, independently of one another, denote F, Cl, CN, $OCF_3$, $CF_3$, $CH_3$, $CH_2$ F or $CHF_2$.

11. A building or vehicle comprising a window element according to claim 1.

12. The window element according to claim 1, wherein the element is configured as an insulated double glazing or a triple glazing unit.

13. The window element according to claim 9, wherein the switchable optical cell is arranged in a laminate further comprising a lamination layer which is UV blocking, and wherein the laminate is facing a light source.

14. The window element according to claim 10, wherein $R^1$, $R^2$, $R^{AC1}$ and $R^{AC2}$ each, independently of one another, denote alkyl or alkoxy having 1 to 6 atoms, and $Z^x$, $Z^y$ and $Z^{AC}$ each denote a single bond.

15. The window element according to claim 1, wherein the liquid-crystalline medium comprises one or more compounds selected from the group of compounds of formulae CY-a and AC-a CY-a

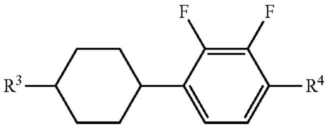

AC-a

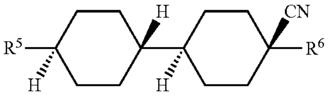

wherein $R^3$, $R^4$, $R^5$ and $R^6$ each, independently of one another, denote alkyl having 1 to 12 C atoms, where, in addition, one or two non-adjacent $CH_2$ groups may be replaced by

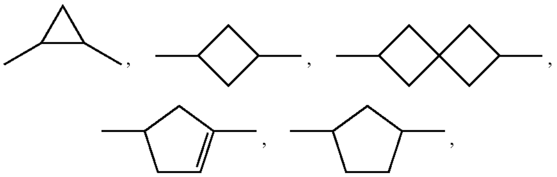

—O—, —CH═CH—, —CO—, —OCO— or —COO— in such a way that O atoms are not linked directly to one another.

16. The window element according to claim 15, wherein $R^3$, $R^5$ and $R^6$ each, independently of one another, denote alkyl having 1 to 6 C atoms and $R^4$ denotes alkoxy having 1 to 6 C atoms.

17. A method of operating the window element according to claim 1, comprising electrically switching the switchable layer when the liquid-crystalline medium is at a temperature at which a nematic phase and an isotropic phase co-exist.

* * * * *